US006823458B1

(12) United States Patent
Lee et al.

(10) Patent No.: US 6,823,458 B1
(45) Date of Patent: Nov. 23, 2004

(54) APPARATUS AND METHOD FOR SECURING RESOURCES SHARED BY MULTIPLE OPERATING SYSTEMS

(75) Inventors: Kam Cheung Lee, Round Rock, TX (US); Wing Hung Lee, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/442,696

(22) Filed: Nov. 18, 1999

(51) Int. Cl.[7] .................................................. H04L 9/32
(52) U.S. Cl. ............................ 713/200; 713/201; 707/9
(58) Field of Search ................................ 713/200, 201; 707/1, 2, 9, 10; 709/216, 223, 200, 224, 226; 711/202; 714/4; 370/399; 345/349

(56) References Cited

U.S. PATENT DOCUMENTS

| | | | | |
|---|---|---|---|---|
| 5,761,669 A | * | 6/1998 | Montague et al. ...... 707/103 R |
| 6,044,367 A | * | 3/2000 | Wolff ............................ 707/2 |
| 6,253,274 B1 | * | 6/2001 | Boonie et al. .............. 710/200 |
| 6,381,682 B2 | * | 4/2002 | Noel et al. ................... 711/153 |
| 6,654,745 B2 | * | 11/2003 | Feldman ......................... 707/9 |

* cited by examiner

Primary Examiner—Kim Vu
Assistant Examiner—Thanhnga Truong
(74) Attorney, Agent, or Firm—Duke W. Yee; Volel Emile; Stephen J. Walder, Jr.

(57) ABSTRACT

An apparatus and method for securing system resources in a concurrent multiple operating system environment wherein when a client device or application requests access to system resources the request is received by the apparatus which then determines if the resources requested are currently being used by another client or application. Based on a unique identifier sent by the client or application, the apparatus searches a resource state data structure for the resource requested and compares the unique identifier sent by the client or application with the unique identifier stored in the resource state data structure in association with the requested resource. If the two unique identifiers are the same, the client/application is provided with access to the requested resource. If the unique identifiers are different, the client/application is denied access to the requested resources.

45 Claims, 3 Drawing Sheets

APPARATUS AND METHOD FOR SECURING RESOURCES SHARED BY MULTIPLE OPERATING SYSTEMS

BACKGROUND OF THE INVENTION

1. Technical Field

The present invention is directed to an apparatus and method for securing resources shared by multiple operating systems. In particular, the present invention is directed to an apparatus and method for use with multiple concurrently running operating systems for preventing access to resources based on a unique resource/operating system identifier.

2. Description of Related Art

The ability to run computer applications in a variety of operating systems using the same device has long been desired. To this end, computer software has been developed in which a single computer may be switched between operating systems. However, when switching from one operating system to another, this software requires that the computer be shut down and rebooted in the new operating system.

Recently, computer software has been developed that allows a single computer to concurrently run multiple operating systems. This computer software is known as VMware™. VMware™ facilitates the concurrent running of multiple operating systems by establishing virtual devices for each operating system, as described, for example in "Virtual Microsoft: VMware 1.0 for Linux," Linux Magazine, October 1999, available at www.vmware.com. Each virtual device is created as virtual disk files which virtualize such computer devices as IDE disk drives and ATAPI CD-ROM drives. In short, a virtual computer is created for each operating system.

A problem arises, however, when operating systems are being run concurrently. Specifically, each virtual device has access to all of the resources of the actual physical device. Thus, operations carried out in one operating system may unintentionally affect operations that are being carried out in another operating system. Applications that are being run in one operating system on a first virtual device may alter data that is essential to the proper functioning of another application concurrently being run in another operating system on another virtual device.

Thus, there is a need for new technology to provide a mechanism by which shared resources may be secured in a multiple operating system environment.

SUMMARY OF THE INVENTION

The invention provides an apparatus and method for securing system resources in a concurrent multiple operating system environment. When a client device or application requests access to system resources the request is received by the apparatus which then determines if the resources requested are currently being used by another client or application. This determination may be made by consulting a resource state data structure in memory which maintains a reserved or locked state of each of the system resources.

If the system resource is not currently locked or reserved by another client or application, the apparatus assigns a unique identifier that the client or application is to use and provides access to the system resources. The unique identifier identifies which resource is accessible by the client or application. The apparatus stores the unique identifier in the resource state data structure and uses it whenever a request for access to the system resources is sent by a client or application. The unique identifier may be included, for example, in header information of the request message sent from the client or application.

Based on the unique identifier sent by the client or application, the apparatus searches the resource state data structure for the resource requested and compares the unique identifier sent by the client or application with the unique identifier stored in the resource state data structure in association with the requested resource. If the two unique identifiers are the same, the client/application is provided with access to the requested resource. If the unique identifiers are different, the client/application is denied access to the requested resources.

If the client/application sends the correct unique identifier, the request is received by a corresponding virtual device of the apparatus which then forwards the request to the requested resource and hence, the client/application is provided access to the system resources through the virtual device.

When the client/application has completed all operations with regard to the system resource, the client/application sends a release message to the apparatus indicating that the lock or reservation on the resource is no longer necessary. In response, the apparatus removes the lock or reservation and places the resource in an unlocked or unreserved state in the resource state data structure.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
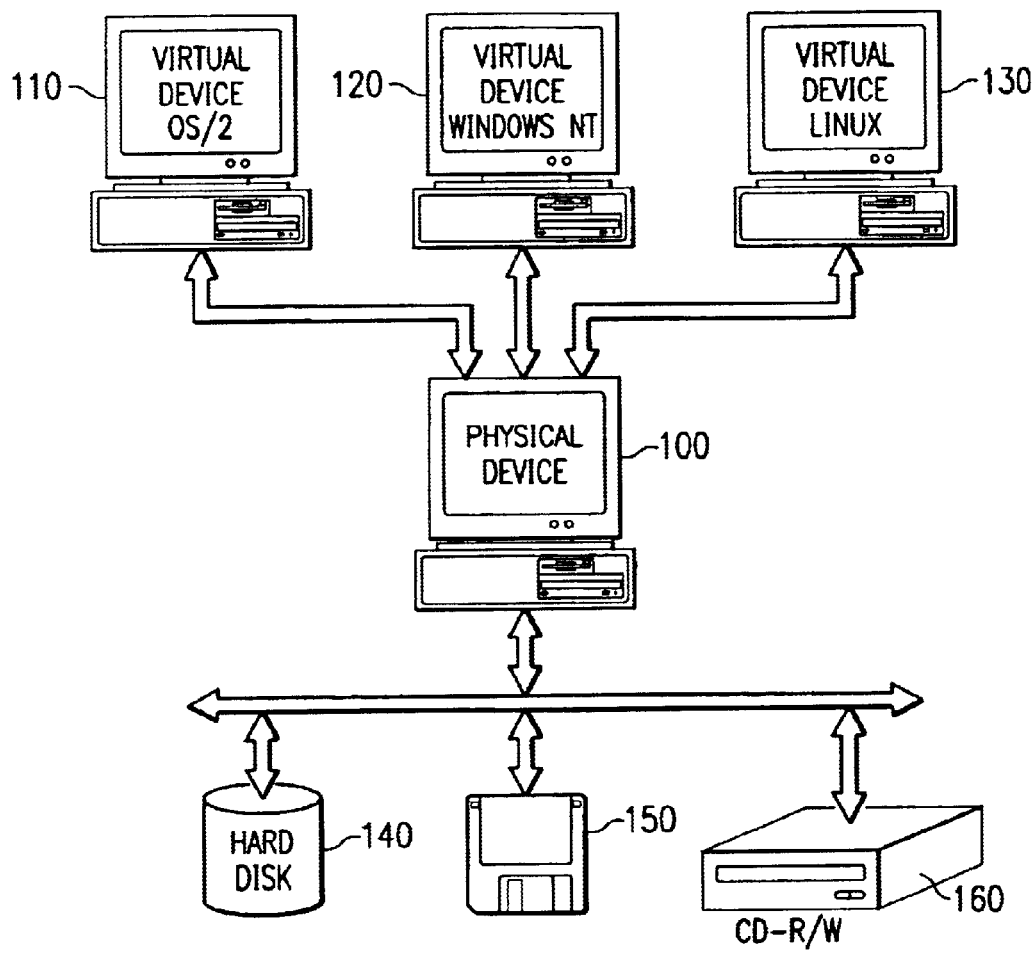
FIG. 1 is an exemplary diagram illustrating a concurrent multiple operating system environment.

FIG. 1 is an exemplary diagram of a concurrent multiple operating system environment. As shown in FIG. 1, the physical device 100, i.e. a computer, is capable of running a plurality of operating systems concurrently such that the physical device 100 need not be rebooted in order to switch between operating systems. For example, the physical device 100 may be a computer operating under the VMware™ software, as described above.

In order for the physical device 100 to operate concurrently in a plurality of operating systems, the physical device 100 may create mirror images of itself for each operating system. These mirror images are called virtual devices and are represented in FIG. 1 as virtual devices 110–130.

Each virtual device 110–130 has access to each of the resources 140–160 associated with the physical device 100.

Only three types of operating systems 110–130 and three types of resources 140–160 are shown in FIG. 1, for ease of explanation. However, it should be appreciated by those of ordinary skill in the art that any number of operating systems and resources may be utilized with the multiple operating system environment of FIG. 1 and other types of operating systems and resources may be used in addition to or in place of those shown in FIG. 1.

Because each virtual device 110–130 may access the same resources 140–160 and hence, the same data on these resources 140–160, there is a risk that applications running under one operating system may perform functions and alter data that is needed by another application running under a second operating system. For example, a first application may write data to a first location of the hard drive 140 and unintentionally, write over data currently being used by a second application in another operating system. This problem arises in that there is no ability between operating systems to monitor and secure the resources 140–160 and/or the data on the resources 140–160 being used.

The present invention provides an apparatus and method for monitoring and securing resources shared by multiple operating systems in a concurrent multiple operating system environment. Thus, with the present invention, the risk of altering data that is needed by other applications running under other operating systems concurrently is minimized.

Figure 2:
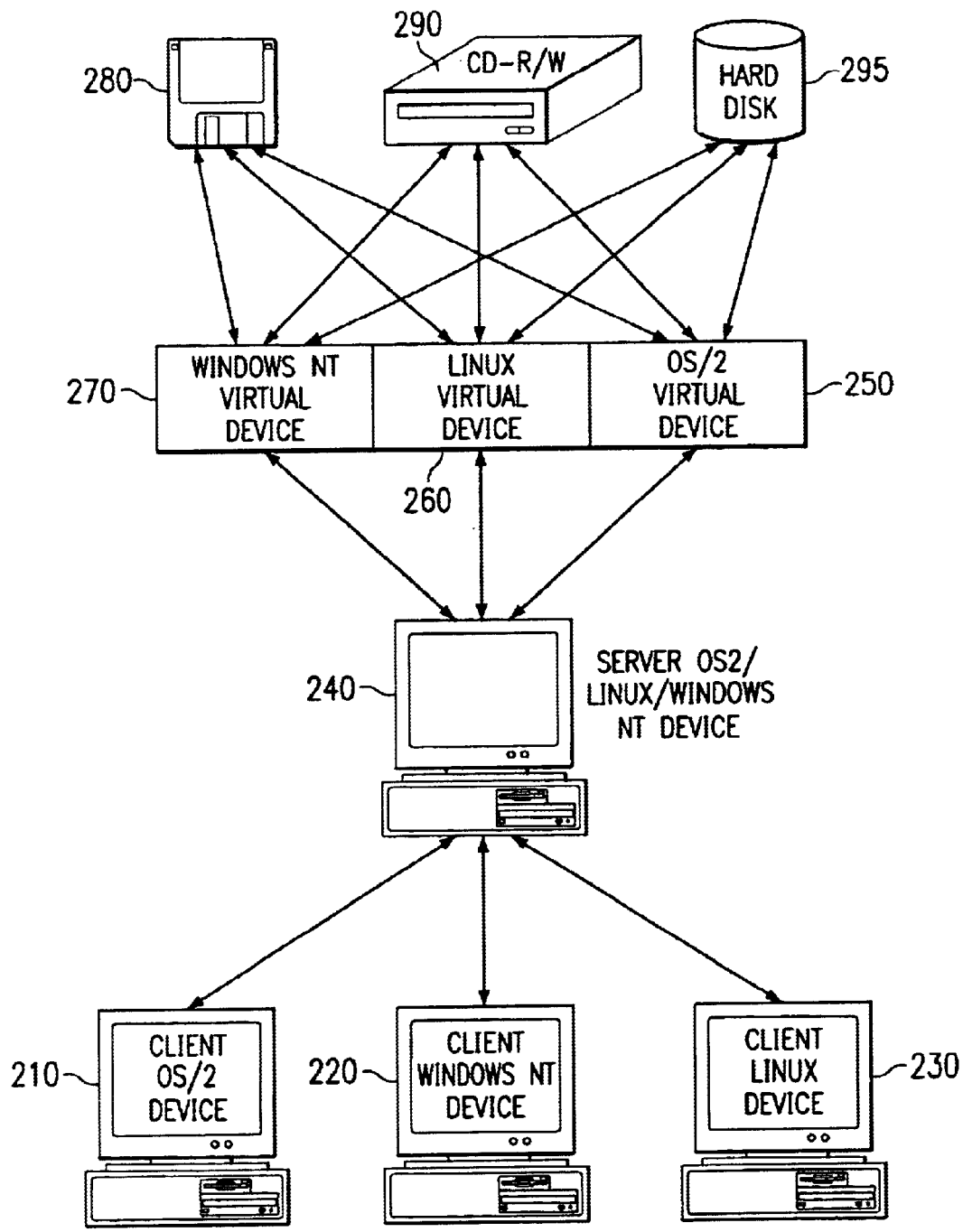
FIG. 2 is an exemplary diagram illustrating a concurrent multiple operating system server and client system.

FIG. 2 is an exemplary diagram illustrating a multiple operating system server and client system 200 according to the present invention. As shown in FIG. 2, the system 200 includes a plurality of clients 210–230 operating under a variety of operating systems. The clients communicate with a concurrent multiple operating system server 240, hereafter referred to as the "server 240," in order to access the resources 280–295 of the server 240.

The client devices 210–230 may be any type of data processing device capable of operating under an operating system, such as Microsoft Windows NT™, OS/2™, Linux™, Microsoft Windows 2000™, and the like. For example, the client devices 210–230 may be personal computers, laptop computers, mainframe computers, point of sale devices, personal digital assistants, and any other now known or later developed data processing device.

The client devices 210–230 communicate with the server 240 over communication links. These communication links may be any type of communication connection between the clients 210–230 and the server 240 that facilitates the communication of data between the clients 210–230 and the server 240. For example, the communication links may be one or more networks, such as local area networks (LANs) and wide area networks (WANs), wired or wireless communication links, the Internet, data packet switched networks, and the like.

The server 240 is a data processing device capable of concurrently running a plurality of operating systems. Just as with the client devices 210–230, the server 240 may be any type of data processing device, such as a mainframe computer, personal computer, and the like.

The server 240 establishes virtual devices 250–270 for each of the concurrently running operating systems. The virtual devices 250–270 may be created using, for example, the VMware™ software and may consist of virtual disk files. Other types of software or hardware capable of running a plurality of operating systems concurrently may be used without departing from the spirit and scope of the present invention.

Each virtual device 250–270 has access to each of the system resources 280–295. The system resources 280–295 may be, for example, a floppy disk, a floppy disk drive, a read/write CD-ROM drive, a CD-ROM disk, a hard disk, RAM, ROM, a DVD drive, a magnetic tape drive, a ZIP disk or JAZZ drive, and the like. In short, any system resource may be used without departing from the spirit and scope of the invention.

When a client device 210, for example, requests access to system resources 280–295, the request is received by the server 240. The server 240 then determines if the resources 280–295 requested are currently being used by another client 220 or 230. This determination may be made by consulting a resource state data structure in memory which maintains a reserved or locked state of each of the system resources 280–295. For purposes of the following description, it is assumed that the resource state data structure maintains the locked state of system resources 280–295.

If the system resource is not currently locked by another client 220 or 230, the server 240 assigns a unique identifier that the client 210 is to use to gain access to the system resources and provides access to the system resources. The unique identifier identifies which resource is accessible by the client 210. Thus, once the client 210 locks the hard disk 295, no other client devices 220 or 230 may access the hard disk 295 until the client 210 releases the lock on the hard disk 295.

The server 240 stores the unique identifier in the resource locked state data structure and uses it whenever a request for access to the system resource is sent by a client 210–230 to the server 240. Thus, when the client 210 sends a request to the server 240 for access to the hard disk 295, the client 210 must include in the request the unique identifier that was assigned by the server 240 when the initial lock on the hard disk 295 was acquired. The unique identifier may be included, for example, in header information of the request message sent from the client 210 to the server 240.

Based on the unique identifier sent by the client 210 to the server 240, the server 240 searches the resource state data structure for the resource requested and compares the unique identifier sent by the client 210 with the unique identifier stored in the resource state data structure in association with the requested resource. If the two unique identifiers are the same, the client 210 is provided with access to the requested resource. If the unique identifiers are different, the client 210 is denied access to the requested resources.

If the client 210 sends the correct unique identifier, the request is received by a corresponding virtual device 250–270 of the server 240. For example, since client 210 is operating in the OS/2 operating system, the request from client 210 will be received by the OS/2 virtual device 250. The OS/2 virtual device 250 then forwards the request to the hard disk 295 and hence, the client 210 is provided access to the hard disk 295 through the OS/2 virtual device 250.

When the client 210 has completed operations with regard to the hard drive 295, for example, the client 210 sends a release message to the server 240 indicating that the lock on the hard drive 295 is no longer necessary. In response, the server 240 removes the lock and places the hard drive 295 in an unlocked state in the resource state data structure. The release message may be sent immediately after the client 210 completes each individual operation, in order to allow other clients to access the system resource between operations, or the release message may be sent at a later time when the client 210 has completed all operations with regard to the system resource.

The unique identifier used to identify the authorized clients 210–230 may be any type of identifier that uniquely identifies the client 210–230, the operating system being used, and/or the resource 280–295 to which the client 210–230 is authorized access. For example, the unique identifier may be a combination of a resource identifier and a virtual device 250–270 identifier. In this way, only devices operating under the particular authorized operating system may be provided access to the resource 280–295. In the example above, only clients 210–230 using the OS/2 operating system and communicating with the hard disk 295 via the OS/2 virtual device 250 may be provided access to the hard disk 295.

Similarly, the unique identifier may be a combination of a client identifier, virtual device identifier, and resource identifier. In this way, only a particular client 210, for example, using a particular operating system may be provided access to the resource. Other types of identifiers may be used without departing from the spirit and scope of the invention.

Figure 3:
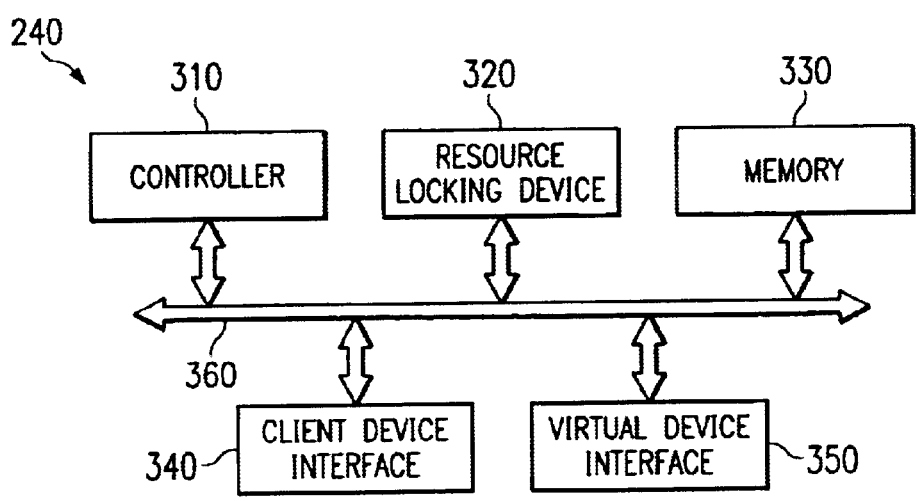
FIG. 3 is an exemplary block diagram of the concurrent multiple operating system server device of FIG. 2.

FIG. 3 is an exemplary block diagram of the server 240 according to the present invention. As shown in FIG. 3, the server 240 includes a controller 310, a resource locking device 320, a memory 330, a client device interface 340 and a virtual device interface 350. These elements 310–350 are in communication with one another via the control/signal bus 360. Although a bus architecture is shown in FIG. 3, other architectures that facilitate communication between the elements 310–350 may be used without departing from the spirit and scope of the invention.

The controller 310 receives requests from client devices 210–230 via the client device interface 340. When the controller 310 receives a request for access to a resource 280–295, the controller 310 forwards the request to the resource locking device 320. The resource locking device 320 searches a resource state data structure in memory 330 to determine if the resource is currently locked by another client device.

If the resource is locked, the resource locking device 320 determines if the client device that sent the request included the correct unique identifier in the request, if so, access to the resource 280–295 is granted. Otherwise, access is denied and the resource locking device 320 sends an "access denied" message back to the client device via the client device interface 340.

If the resource is not locked, the resource locking device 320 assigns a unique identifier, which may be a combination of the resource identifier and an operating system identifier, for example, and provides the client device 210–230 with access to the resource via the virtual device interface 350 and the corresponding virtual device 250–270.

When the client 210–230 has completed its operations with regard to the locked resource 280–295, the client 210–230 sends a release message to the server 240. As noted above, the release message may be sent at the completion of each individual operation or after all operations have been completed. The controller 310 receives the release message via the client device interface 340 and instructs the resource locking device 320 to release the lock on the resource 280–295. In response, the resource locking device 320 modifies the resource state data structure in memory 330 to reflect that the resource is not locked by a virtual device 250–270.

Figures 4, 5:
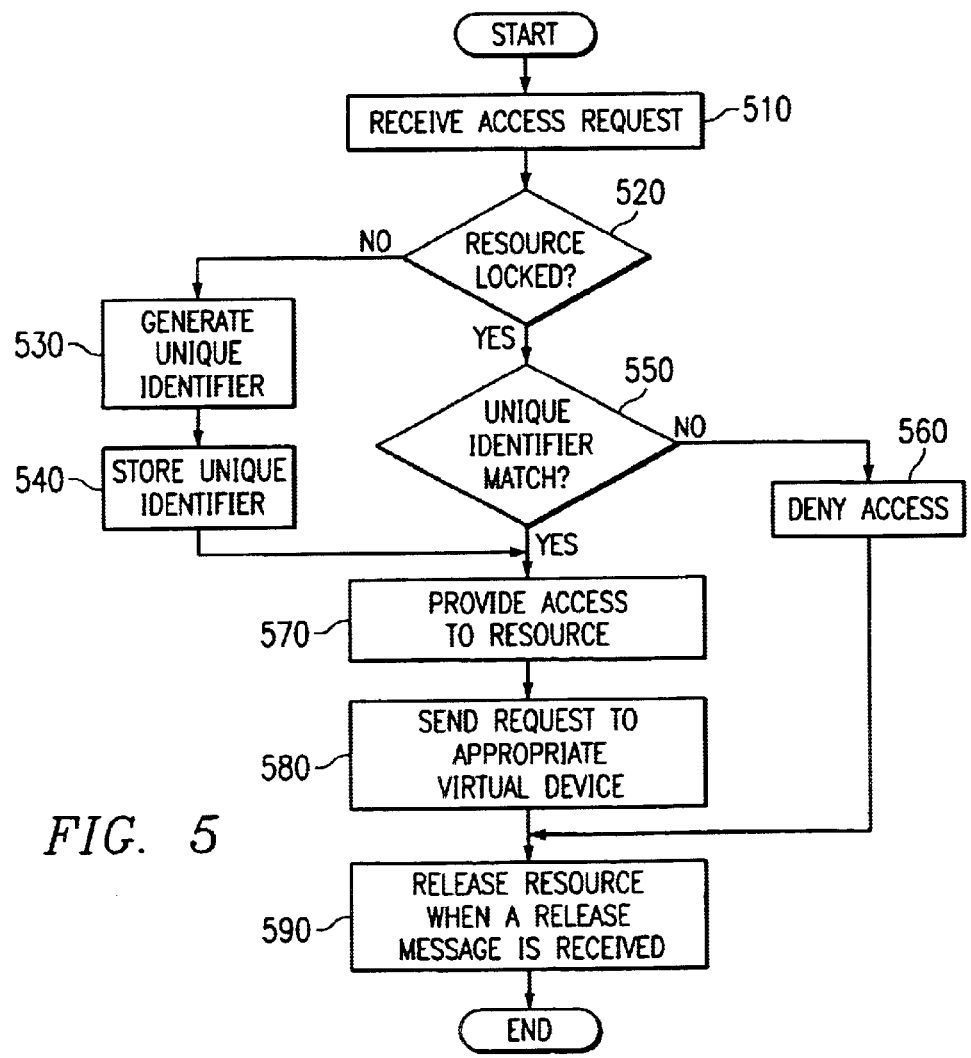
FIG. 4 is an exemplary diagram of a resource state data structure according to the present invention.
FIG. 5 is a flowchart outlining an exemplary operation of the concurrent multiple operating system server device of FIG. 3.

FIG. 4 is an exemplary diagram of a resource state data structure 400. As shown in FIG. 4, the resource state data structure 400 includes a field 410 for a resource identifier, a field 420 for a locked state flag (or reservation flag), and a field 430 for a unique identifier. Other fields may be used in addition to or in place of these fields 410–430 without departing from the spirit and scope of the invention.

When a request for access to a resource 280–295 is received by the server 240, the resource locking device 320 searches the field 410 for a resource identifier corresponding to the requested resource 280–295. Once the appropriate resource 280–295 is found in the resource state data structure 400, the field 420 is retrieved to determine if the resource is already locked. If so, the resource locking device 320 retrieves the field 430 and compares the unique identifier, if any, forwarded with the access request to the unique identifier stored in field 430. If the resource is not locked, the resource locking device 320 generates a unique identifier and stores it in field 430.

FIG. 5 is a flowchart outlining an exemplary operation of the concurrent multiple operating system server 240 of FIG. 3. As shown in FIG. 5, the operation starts when the controller 310 receives an access request from a client device 210–230 via the client device interface 340 (step 510). The controller 310 sends the request to the resource locking device 320 which determines if the requested resource is currently locked (step 520). If the resource is not locked (step 520:NO), the resource locking device 320 generates a unique identifier (step 530) and locks the resource 280–295 by storing the unique identifier in the resource state data structure 400 and changing the resource locked flag in field 420 (step 540).

If the resource is already locked (step 520:YES), the resource locking device 320 determines if the unique identifier forwarded in the request message is identical to the unique identifier in field 430 for the requested resource (step 550). If the unique identifiers are not identical (step 550:NO), access to the resource is denied (step 560). If the unique identifiers are identical (step 550:YES), the resource locking device 320 provides access to the system resources (step 570) and sends the request to the appropriate virtual device for the operating system used by the client 210–230 (step 580).

If after providing access to the resource, the resource locking device 320 receives a resource release message, the resource locking device 320 releases the lock, or the reservation, on the resource. The release of the lock on the resource may involve resetting the lock flag and removal of the unique identifier associated with the resource in the resource state data structure 400. Control then ends.

While the above embodiment of the invention has been described with reference to the resources 280–295 being physical devices, the invention is not limited to such an embodiment. Rather any type of resource may be used in place of or in addition to the physical devices described above.

For example, rather than physical devices, the resources 280–295 may be data stored in a memory or storage device. This data may be identified by filenames, address locations, and the like. Thus, rather than having a device identifier in the resource identifier field 410 of the resource state data structure 400, the resource identifier field 410 may include filenames or address locations. The granting or denial of access to the files and/or data identified by the filenames and/or address locations is performed in substantially the same manner as set forth above.

Furthermore, while the above embodiments have been described with reference to client devices 210–230 that are separate devices from the server 240, the invention is not limited to such embodiments. Rather, the client devices 210–230 may be, for example, applications running on the server 240 making use of different operating systems.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of securing resources in a concurrent multiple operating system environment, comprising:
   receiving a request for access to a resource;
   determining if the resource is locked;
   in response to a determination that the resource is not locked, generating a unique identifier for accessing the resource; and
   providing the unique identifier to a requesting device that originated the request in response to generating the unique identifier, wherein the unique identifier is not stored in the requesting device prior to the unique identifier being provided to the requesting device in response to a determination that the resource is not locked.

2. The method of claim 1, wherein the request includes a request identifier and wherein if the resource is locked, the method further comprises:
   comparing the request identifier with a unique identifier associated with the resource; and
   if the request identifier matches the unique identifier associated with the resource, providing access to the resource.

3. The method of claim 2, wherein if the request identifier does not match the unique identifier associated with the resource, access to the resource is denied.

4. The method of claim 1, wherein determining if the resource is locked includes retrieving information from a resource state data structure corresponding to the resource, the information including a locked flag.

5. The method of claim 2, wherein comparing the request identifier with a unique identifier associated with the resource includes retrieving information from a resource state data structure corresponding to the resource, the information including the unique identifier associated with the resource.

6. The method of claim 1, wherein the resource is at least one of a floppy disk, a floppy disk drive, a read/write CD-ROM drive, a CD-ROM disk, a hard disk, RAM, ROM, a DVD drive, a magnetic tape drive, a ZIP disk, a JAZZ drive, data, and a computer file.

7. The method of claim 1, wherein the unique identifier uniquely identifies the resource and an operating system being used by the requesting device.

8. The method of claim 1, wherein the unique identifier is a combination of a resource identifier and a virtual device identifier.

9. The method of claim 1, wherein the unique identifier is a combination of a requesting device or application identifier, a virtual device identifier, and resource identifier.

10. The method of claim 2, wherein providing access to the resource includes forwarding the request to a virtual device corresponding to the operating system of the requesting device.

11. The method of claim 1, wherein if the resource is locked, the method further comprises:
    unlocking the resource when a release message is received.

12. The method of claim 11, wherein the release message is received immediately after each individual operation performed with the resource.

13. The method of clam 11, wherein the release message is received after all operations associated with a client device and the resource are performed with the resource.

14. A computer program product in a computer readable medium for securing resources in a concurrent multiple operating system environment, comprising:
    first instructions for receiving a request for access to a resource;
    second instructions for determining if the resource is locked;
    third instructions for generating a unique identifier for accessing the resource in response to a determination that the resource is not locked; and
    fourth instructions for providing the unique identifier to a requesting device that originated the request in response to generating the unique identifier, wherein the unique identifier is not stored in the requesting device prior to the unique identifier being provided to the requesting device in response to a determination that the resource is not locked.

15. The computer program product of claim 14, wherein the request includes a request identifier and wherein the second instructions include instructions for comparing the request identifier with a unique identifier associated with the resource if the resource is locked and the third instructions include instructions for providing access to the resource, if the request identifier matches the unique identifier associated with the resource.

16. The computer program product of claim 15, wherein if the request identifier does not match the unique identifier associated with the resource, the third instructions include instructions for denying access to the resource.

17. The computer program product of claim 14, wherein the second instructions include instructions for retrieving information from a resource state data structure corresponding to the resource, the information including a locked flag.

18. The computer program product of claim 15, wherein the instructions for comparing the request identifier with a unique identifier associated with the resource includes instructions for retrieving information from a resource state data structure corresponding to the resource, the information including the unique identifier associated with the resource.

19. The computer program product of claim 14, wherein the resource is at least one of a floppy disk, a floppy disk drive, a read/write CD-ROM drive, a CD-ROM disk, a hard disk, RAM, ROM, a DVD drive, a magnetic tape drive, a ZIP disk, a JAZZ drive, data, and a computer file.

20. The computer program product of claim 14, wherein the unique identifier uniquely identifies the resource and an operating system being used by the requesting device.

21. The computer program product of claim 14, wherein the unique identifier is a combination of a resource identifier and a virtual device identifier.

22. The computer program product of claim 14, wherein the unique identifier is a combination of a requesting device or application identifier, a virtual device identifier, and resource identifier.

23. The computer program product of claim 15, wherein the instructions for providing access to the resource includes instructions for forwarding the request to a virtual device corresponding to the operating system of the requesting device.

24. A concurrent multiple operating system environment apparatus, comprising:

a controller;

an interface; and a resource locking device, wherein the controller receives a request for access to a resource via the interface and instructs the resource locking device to determine if the resource is locked, and wherein in response to a determination that the resource is not locked, the resource locking device generates a unique identifier for accessing the resource and provides access the unique identifier to a requesting device that originated the request in response to the unique identifier being generated, wherein the unique identifier is not stored in the requesting device prior to the unique identifier being provided to the requesting device in response to a determination that the resource is not locked.

25. The apparatus of claim 24, wherein the request includes a request identifier and wherein if the resource is locked, the resource locking device compares the request identifier with a unique identifier associated with the resource and if the request identifier matches the unique identifier associated with the resource, the resource locking device provides access to the resource.

26. The apparatus of claim 25, wherein if the request identifier does not match the unique identifier associated with the resource, the resource locking device denies access to the resource.

27. The apparatus of claim 24, wherein the resource locking device determines if the resource is locked by retrieving information from a resource state data structure corresponding to the resource, the information including a locked flag.

28. The apparatus of claim 25, wherein the resource locking device compares the request identifier with a unique identifier associated with the resource by retrieving information from a resource state data structure corresponding to the resource, the information including the unique identifier associated with the resource.

29. The apparatus of claim 24, wherein the resource is at least one of a floppy disk, a floppy disk drive, a read/write CD-ROM drive, a CD-ROM disk, a bard disk, RAM, ROM, a DVD drive, a magnetic tape drive, a ZIP disk, a JAZZ drive, data, and a computer file.

30. The apparatus of claim 24, wherein the unique identifier uniquely identifies the resource and an operating system being used by the requesting device.

31. The apparatus of claim 24, wherein the unique identifier is a combination of a resource identifier and a virtual device identifier.

32. The apparatus of claim 24, wherein the unique identifier is a combination of a requesting device or application identifier, a virtual device identifier, and resource identifier.

33. The apparatus of claim 25, wherein the resource locking device provides access to the resource by forwarding the request to a virtual device corresponding to the operating system of the requesting device.

34. The apparatus of claim 24, wherein if the resource is locked, the resource locking device unlocks the resource when a release message is received.

35. The apparatus of claim 34, wherein the release message is received immediately after each individual operation is performed with the resource.

36. The apparatus of claim 34, wherein the release message is received after all operations associated with a client device and the resource are performed with the resource.

37. A method of reserving resources in a concurrent multiple operating system environment, comprising:

receiving a request for access to a resource from a device;

determining if the resource is reserved by another device;

in response to a determination that the resource is not reserved by another device, generating a unique identifier for accessing the resource; and provideing the unique identifier to a requesting device that originated the request in response to generating the unique identifier, wherein the unique identifier is not stored in the requesting device prior to the unique identifier being provided to the requesting device in response to a determination that the resource is not locked.

38. The method of claim 37, wherein the request includes a request identifier and wherein if the resource is reserved by another device, the method further comprises:

comparing the request identifier with a unique identifier associated with the resource; and if the request identifier matches the unique identifier associated with the resource, providing access to the resource.

39. The method of claim 38, wherein if the request identifier does not match the unique identifier associated with the resource, access to the resource is denied.

40. The method of claim 37, wherein determining if the resource is reserved by another device includes retrieving information from a resource state data structure corresponding to the resource, the information including a reservation flag.

41. The method of claim 38, wherein comparing the request identifier with a unique identifier associated with the resource includes retrieving information from a resource state data structure corresponding to the resource, the information including the unique identifier associated with the resource.

42. The method of claim 37, wherein the unique identifier uniquely identifies the resource and an operating system being used by the device.

43. The method of claim 37, wherein the unique identifier is a combination of a resource identifier and a virtual device identifier.

44. The method of claim 37, wherein the unique identifier is a combination of a device identifier, a virtual device identifier, and a resource identifier.

45. The method of claim 38, wherein providing access to the resource includes forwarding the request to a virtual device corresponding to the operating system of the device.

* * * * *

UNITED STATES PATENT AND TRADEMARK OFFICE
CERTIFICATE OF CORRECTION

PATENT NO. : 6,823,458 B1
DATED : November 23, 2004
INVENTOR(S) : Lee et al.

It is certified that error appears in the above-identified patent and that said Letters Patent is hereby corrected as shown below:

Column 9,
Line 23, after "provides" delete "access".
Line 54, after "a CD-ROM disk, a" delete "bard" and insert -- hard --.

Column 10,
Line 19, after "another" delete the return.
Line 21, after "resource; and" insert a return.
Line 21, before "the unique" delete "providing" and insert -- providing --.

Signed and Sealed this

Tenth Day of January, 2006

JON W. DUDAS
*Director of the United States Patent and Trademark Office*